United States Patent
Le Creff (10) Patent No.: US 10,882,414 B2
(45) Date of Patent: Jan. 5, 2021

(54) MANAGING AN INSTALLATION FOR CHARGING ELECTRIC MOTOR VEHICLE BATTERIES IN A PARKING LOT

(71) Applicant: OMNINOV, Vigny (FR)

(72) Inventor: Michel Le Creff, Vigny (FR)

(73) Assignee: OMNINOV, Vigny (FR)

( * ) Notice: Subject to any disclaimer, the term of this patent is extended or adjusted under 35 U.S.C. 154(b) by 111 days.

(21) Appl. No.: 16/313,095

(22) PCT Filed: Jun. 12, 2017

(86) PCT No.: PCT/FR2017/051495
§ 371 (c)(1),
(2) Date: Dec. 24, 2018

(87) PCT Pub. No.: WO2018/007699
PCT Pub. Date: Jan. 11, 2018

(65) Prior Publication Data
US 2019/0225106 A1    Jul. 25, 2019

(30) Foreign Application Priority Data
Jul. 4, 2016 (FR) ..................................... 16 56375

(51) Int. Cl.
*B60L 53/63* (2019.01)
*G06Q 10/06* (2012.01)
(Continued)

(52) U.S. Cl.
CPC ............ *B60L 53/63* (2019.02); *B60L 53/305* (2019.02); *B60L 53/31* (2019.02); *B60L 53/65* (2019.02);
(Continued)

(58) Field of Classification Search
CPC ........ B60L 53/63; B60L 53/305; B60L 53/31; B60L 53/65; G06Q 10/06; G07F 15/005; Y02T 90/128; Y02T 90/12; G07B 15/00
(Continued)

(56) References Cited

U.S. PATENT DOCUMENTS 5,202,617 A * 4/1993 Nor .......................... H02J 7/008
320/130
5,684,379 A * 11/1997 Svedoff ............... B60L 11/1816
320/125

(Continued)

FOREIGN PATENT DOCUMENTS

| WO | 2013015306 | 1/2013 |
| WO | 2016079419 | 5/2016 |

OTHER PUBLICATIONS

International Search Report dated Aug. 1, 2017.
French Search Report dated Mar. 17, 2017.

*Primary Examiner* — M Baye Diao
(74) *Attorney, Agent, or Firm* — Ipsilon USA, LLP (57) ABSTRACT

The invention relates to a method for managing charging currents delivered by an installation (1) for charging electric vehicle batteries in a parking lot (P), comprising a set of electric charging terminals ($B_1, \ldots B_N$) connected to an electric power distribution network (2), each terminal being able to deliver a charging current value to an electric vehicle ($VE_1, \ldots VE_j$) connected thereto. The method comprises: determining a maximum permissible value of the current at a connection point (3) for connecting the installation (1) to the network (2); storing, in a central management system (4) linked to the terminals, on the one hand, the electric charging terminals of a first subset of said set corresponding to the occupied terminals and, on the other hand, the electric charging terminals of a second subset corresponding to the available terminals; measuring the sum of the charging (Continued)

currents delivered by the terminals of the first subset; computing, by the system (4), an available current value according to a difference between the maximum permissible value and the sum of the delivered charging currents; and, for each new electric vehicle entering the parking lot (P) for charging purposes: computing, by the system (4), a deviation between the computed available current value and a charging current value able to be delivered by a determined terminal of the second subset; if the deviation is negative, transmitting, to one or more terminals selected from the first set, an order to reduce the charging current value delivered by each terminal to the vehicle connected thereto, so as to cover the deviation in absolute value; and transmitting, to the determined terminal of the second subset, an authorization message for charging the new vehicle at a predetermined charging current value.

24 Claims, 5 Drawing Sheets

(51) Int. Cl.
    *G07F 15/00*      (2006.01)
    *B60L 53/65*      (2019.01)
    *B60L 53/30*      (2019.01)
    *B60L 53/31*      (2019.01)
    *G07B 15/00*      (2011.01)

(52) U.S. Cl.
    CPC ............ *G06Q 10/06* (2013.01); *G07F 15/005* (2013.01); *G07B 15/00* (2013.01); *Y02T 90/12* (2013.01)

(58) Field of Classification Search
    USPC .......................................................... 320/109
    See application file for complete search history.

(56) References Cited

U.S. PATENT DOCUMENTS

| | | | | |
|---|---|---|---|---|
| 5,803,215 | A * | 9/1998 | Henze | B60L 53/305 191/2 |
| 5,926,004 | A * | 7/1999 | Henze | H02J 7/0027 320/109 |
| 8,314,587 | B2 * | 11/2012 | White | B60L 53/305 320/103 |
| 8,594,859 | B2 * | 11/2013 | Contreras Delpiano | G06Q 30/02 701/2 |
| 9,112,382 | B2 * | 8/2015 | Paul | B60L 53/63 |
| 9,168,839 | B2 * | 10/2015 | Paupert | B60L 53/16 |
| 9,221,347 | B2 * | 12/2015 | Kuribayashi | B60L 53/30 |
| 9,434,268 | B2 * | 9/2016 | DeBoer | B60L 53/14 |
| 9,676,287 | B2 * | 6/2017 | Stempin | B60L 11/1824 |
| 9,682,633 | B2 * | 6/2017 | Yano | H02J 3/383 |
| 2009/0115368 | A1 * | 5/2009 | Bullis | H02J 3/38 320/101 |
| 2010/0181957 | A1 * | 7/2010 | Goeltner | B60L 53/62 320/101 |
| 2011/0037429 | A1 * | 2/2011 | DeBoer | B60L 53/305 320/109 |
| 2011/0202476 | A1 | 8/2011 | Nagy et al. | |
| 2013/0013382 | A1 | 1/2013 | Alexander | |
| 2013/0335025 | A1 * | 12/2013 | Kuribayashi | B60L 53/52 320/109 |
| 2014/0021917 | A1 * | 1/2014 | Paupert | B60L 53/305 320/109 |
| 2014/0225564 | A1 * | 8/2014 | North | G05D 1/0027 320/109 |
| 2015/0008888 | A1 | 1/2015 | Chevalley et al. | |

\* cited by examiner

| Terminal identifier | Vehicle identifier | Driver identifier | Max. terminal power | Allocated current | Measured current | Terminal status | Total power Wh |
|---|---|---|---|---|---|---|---|
| Terminal $B_1$ | $VE_1$ | Driver $VE_1$ | P1 KW | 30A | 30A | Charging | 5670 |
| Terminal $B_2$ | | | P1 KW | 0 | 0 | Available | 0 |
| ... | ... | ... | ... | ... | ... | ... | ... |
| Terminal $B_i$ | $VE_i$ | Driver $VE_i$ | P3 KW | 0 | 0 | End of charging | 9520 |
| ... | ... | ... | ... | ... | ... | ... | ... |
| Terminal $B_N$ | | | P3 KW | 0 | 0 | | 0 |

| Terminal id. | Vehicle id. | Driver id. | Max. terminal power | I allocated | I measured | Terminal status | Total power Wh | Charger power |
|---|---|---|---|---|---|---|---|---|
| $B_1$ | $VE_1$ | Driver $VE_1$ | P1 KW | 15A | 10A | Charging | 5670 | 3.5 KW |
| $B_2$ | | | P1 KW | 0 | 0 | Available | 0 | |
| ... | ... | ... | ... | ... | ... | ... | ... | |
| $B_i$ | $VE_i$ | Driver $VE_i$ | P3 KW | 0 | 0 | End of charging | 9520 | 7 KW |
| ... | ... | ... | ... | ... | ... | ... | ... | |
| $B_N$ | $VE_N$ | Driver $VE_N$ | P3 KW | 0 | 0 | Allocated | 0 | 7 KW |

MANAGING AN INSTALLATION FOR CHARGING ELECTRIC MOTOR VEHICLE BATTERIES IN A PARKING LOT

RELATED APPLICATION

This application is a National Phase of PCT/FR2017/051495, filed on Jun. 12, 2017, which claims the benefit of priority from French Patent Application No. 16 56375, filed on Jul. 4, 2016, the entirety of which are incorporated by reference.

BACKGROUND

Field of the Invention

The invention generally relates to managing the charging of electric motor vehicle batteries in a parking lot.

Description of Related Art

Currently, the pool of electric or hybrid motorcars is still relatively modest. Furthermore, parking lots, which are either public or private, provide a low number of charging terminals. The power impact on the electric installation associated with a parking lot is, for this reason, fairly low and until now has not required the implementation of specific strategies for managing charging terminals.

However, by 2020, a significant increase in sales of electric vehicles is expected. An increasingly high number of charging terminals therefore will need to be provided in parking lots. However, in a parking lot in which charging terminals for charging electric vehicle batteries are installed, the total value of the electric current consumed by all the terminals operating simultaneously must not exceed the maximum permissible value of the current at the connection point for connecting the electric installation to the electric power distribution network.

Furthermore, it is highly desirable for provision to be made, when numerous electric vehicles are charged simultaneously, for equal distribution of the electric power stored in the batteries of these vehicles.

In particular, in order to provide a user of the parking lot with a better service, any incoming electric vehicle should be provided, as long as an available charging terminal exists, with the possibility of being able to begin charging their battery at the maximum current that this terminal is able to deliver.

Objects and Summary

The aim of the present invention is to propose a method and a system for managing the charging of batteries of electric or hybrid vehicles in a parking lot that particularly meets the aforementioned objectives.

More specifically, the aim of the present invention is a method for managing charging currents delivered by an installation for charging electric vehicle batteries in a parking lot, said installation comprising a set of electric charging terminals connected to an electric power distribution network, each electric charging terminal being able to deliver a charging current value to an electric vehicle connected thereto, comprising the following steps:

determining a maximum permissible value $I_{MAX}$ of the current at a connection point for connecting the installation to the electric power distribution network and storing said maximum permissible value $I_{MAX}$ in a central management system linked to said terminals of the set;

centralized storing, in said central management system, on the one hand, of the electric charging terminals belonging to a first subset of said set of electric charging terminals, said first subset comprising terminals, called occupied terminals, to which a charging electric vehicle is connected and, on the other hand, of the electric charging terminals belonging to a second subset of said set of electric charging terminals, said second subset comprising the available terminals to which no electric vehicle is connected;

measuring the sum of the charging currents delivered by the electric charging terminals of said first subset;

computing, by the central management system, an available current value $I_{disp}$ according to a difference between said maximum permissible value $I_{MAX}$ and the sum of the delivered charging currents; and for each new electric vehicle entering said parking lot for charging purposes:

computing, by the central management system, a deviation between the computed available current value $I_{disp}$ and a charging current value able to be delivered by a determined terminal of the second subset;

if said deviation is negative, transmitting, to one or more terminal(s) selected from the first set, an order to reduce the charging current value delivered by each terminal to the vehicle connected thereto, the sum of the corresponding reductions being intended to cover said deviation in absolute value; and transmitting, to said one determined terminal of the second subset, an authorization message for charging said new incoming vehicle at a predetermined charging current value.

According to other preferred aspects of the invention, taken individually or in combination:

the predetermined charging current value preferably corresponds to a maximum value of the charging current able to be delivered by said determined terminal of the second subset;

the terminals to which a reduction order is transmitted are advantageously selected according to the amount of electric power that they have already delivered to the vehicles connected thereto, whilst favoring the highest amounts;

the method can further comprise, as soon as a vehicle connected to a charging terminal of the first set disconnects, updating the steps of storing, of measuring the sum of the charging currents and of computing, by the central management system, the available current value $I_{disp}$, and transmitting, to at least one of the terminals that previously received a reduction order, a new order to increase the charging current value that it delivers to the vehicle connected thereto by a value that is determined as a function of the updated available current value $I_{disp}$;

the step of computing the deviation can be performed as soon as the new incoming electric vehicle connects to said determined terminal;

the method can comprise an allocation step for determining the available terminal to which the new incoming vehicle should connect;

the allocation of a terminal is preferably performed by the central management system, based on at least one identification parameter of the new vehicle and/or of its driver;

said at least one identification parameter allows at least the maximum power of a battery charger on board said new vehicle to be determined;

the method can further comprise a step of verifying the pairing between the new incoming vehicle and the allocated charging terminal in order to authorize charging if the result of the verification is positive and to prevent it if the result is negative;

the step of determining a maximum value $I_{MAX}$ advantageously comprises periodic polling, by the central management system, of a smart meter.

A further aim of the invention is a system for managing charging currents delivered by an installation for charging electric vehicle batteries in a parking lot, said installation comprising a set of electric charging terminals connected to an electric power distribution network, each electric charging terminal being able to deliver a charging current value to an electric vehicle connected thereto, said management system comprising:

means for determining a maximum permissible value $I_{MAX}$ of the current at a connection point for connecting the installation to the electric power distribution network;

a central management system connected to said terminals of the set and able to store said maximum permissible value $I_{MAX}$, said central management system also being able to store, on the one hand, the electric charging terminals belonging to a first subset of said set of electric charging terminals, said first subset comprising the terminals, called occupied terminals, to which a charging electric vehicle is connected and, on the other hand, the electric charging terminals belonging to a second subset of said set of electric charging terminals, said second subset comprising the available terminals to which no electric vehicle is connected;

means for measuring the sum of the charging currents delivered by the electric charging terminals of said first subset;

said central management system also being able to compute an available current value $I_{disp}$ according to a difference between said maximum permissible value $I_{MAX}$ and the sum of the delivered charging currents, and, for each new electric vehicle entering said parking lot for charging purposes, being able:

to compute a deviation between the computed available current value $I_{disp}$ and a charging current value able to be delivered by a determined terminal of the second subset;

if said deviation is negative, to transmit, to one or more terminal(s) selected from the first set, an order to reduce the charging current value delivered by each terminal to the vehicle connected thereto, the sum of the corresponding reductions being intended to cover said deviation in absolute value; and to transmit, to said determined terminal of the second subset, an authorization message for charging said new incoming vehicle at a predetermined charging current value.

According to possible additional features, the system further comprises a first device for exchanging identification information of the new incoming vehicle and/or of its driver, placed in the vicinity of or integrated in a device for controlling access to the parking lot, said first device being able to exchange identification information with a wireless communication and identification module allowing a vehicle and/or its driver to be identified and to transmit this identification information to said central management system.

Said first device is also advantageously able to receive a terminal allocation message transmitted by said central management system, the allocation message comprising information representing an allocated terminal, and to relay this message to said wireless communication and identification module.

The system further comprises a second device for exchanging identification information of the new incoming vehicle and/or of its driver, placed in the vicinity of or integrated in said allocated terminal, said second device being able to exchange identification information with said wireless communication and identification module allowing a vehicle and/or its driver to be identified.

The system can further comprise a device for storing and recovering power, and the central management system is able to determine and to control the periods for storing and recovering electric power and a charging current value of a battery of the device for storing and recovering power.

A further aim of the invention is a central management system for implementing the aforementioned management method, said central management system being able to exchange messages with each of the terminals of the charging installation, and being able:

to store said maximum permissible value $I_{MAX}$;

to store, on the one hand, the electric charging terminals belonging to said first subset of said set of electric charging terminals and, on the other hand, the electric charging terminals belonging to said second subset of said set of electric charging terminals;

to compute said available current value $I_{disp}$ according to a difference between said maximum permissible value $I_{MAX}$ and the sum of the delivered charging currents, and, for each new electric vehicle entering said parking lot for charging purposes:

to compute a deviation between the computed available current value $I_{disp}$ and a charging current value able to be delivered by a determined terminal of the second subset;

if said deviation is negative, to transmit, to one or more terminal(s) selected from the first set, an order to reduce the charging current value delivered by each terminal to the vehicle connected thereto, the sum of the corresponding reductions being intended to cover said deviation in absolute value; and to transmit, to said one determined terminal of the second subset, an authorization message for charging said new incoming vehicle at a predetermined charging current value.

Said central management system may also be able to deactivate all or part of the charging of motor vehicles, in particular on receipt of commands received from the electric power distribution network.

A further aim of the invention is an electric charging terminal for implementing the aforementioned management method, which terminal is able to deliver a current charging value to an electric vehicle connected thereto according to a reduction order or an authorization message delivered by said central management system.

Finally, the aim of the invention is a wireless communication and identification module comprising wireless transmission-reception means able to exchange identification information of a vehicle and/or of its driver with said first and said second devices for exchanging identification information of the management system.

BRIEF DESCRIPTION OF THE DRAWINGS

The invention and the various advantages that it provides will be better understood with reference to the following description, which is provided with reference to the accompanying drawings, in which.

DETAILED DESCRIPTION

Throughout the remainder of the description, and unless otherwise stated, the common elements throughout the figures will use the same reference signs.

Figure 1:
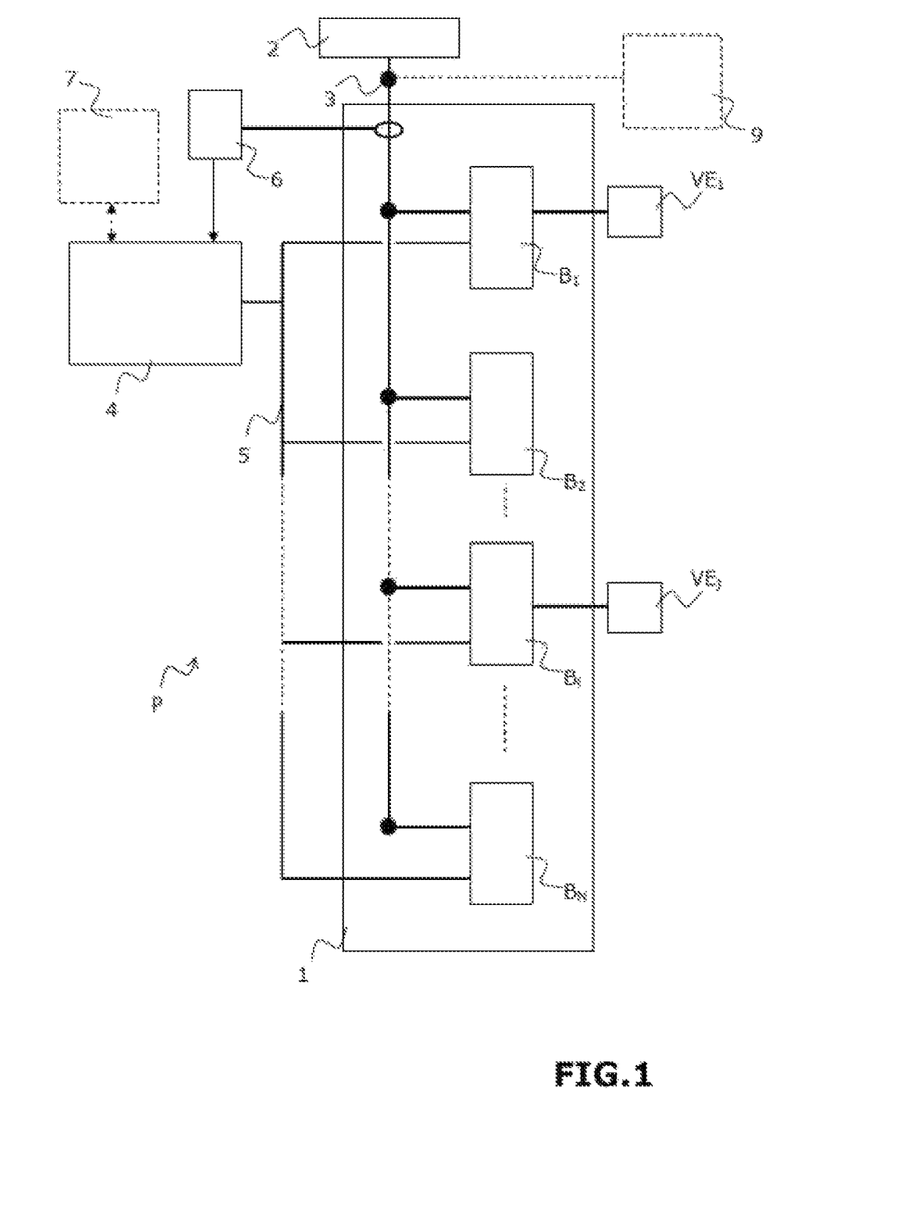
FIG. 1 schematically shows an example of the architecture of a system for managing an installation of charging terminals located in a parking lot.

FIG. 1 schematically shows a possible architecture for a system for managing an installation 1 for charging electric vehicle batteries in a parking lot P. The elements shown as dashed lines in FIG. 1 are optional but correspond to a sophisticated version of the system.

As shown in FIG. 1, the installation 1 comprises a set of N electric charging terminals referenced $B_1$, $B_2$, ... $B_i$, ... $B_N$. These electric charging terminals are connected to an electric power distribution network 2, at a connection point 3.

Each electric charging terminal $B_1$, $B_2$, ... $B_i$, ... $B_N$ is able to deliver a charging current value $I_1$, $I_2$, ... $I_i$, ... $I_N$ to the electric vehicle $VE_1$, ... $VE_j$ connected thereto. In the example of FIG. 1, it has been assumed that only two vehicles, $VE_1$ and $VE_j$, are already present in the parking lot P and are connected to a terminal, respectively $B_1$ and $B_i$, for charging their battery.

According to the invention, the installation 1 is basically managed by means of a central management system 4 linked to said terminals $B_1$, $B_2$, ... $B_i$, $B_N$ of the set by a communication link 5, and is based on the principle that the charging terminals of the invention have a variable charging power, the value of which can be modulated or modified by the central management system 4 by means of a suitable order or message transmitted to the terminal by the communication link 5.

The management architecture further comprises means for measuring the sum of the charging currents delivered by all the terminals when they are connected to a vehicle, typically an electric meter 6 connected to the central management system 4 and, in an optional configuration, a device 7 for controlling the entry of a new vehicle, typically associated with a barrier granting or preventing access to the parking lot for electric charging purposes, and also linked to the central management system 4.

Figure 2:
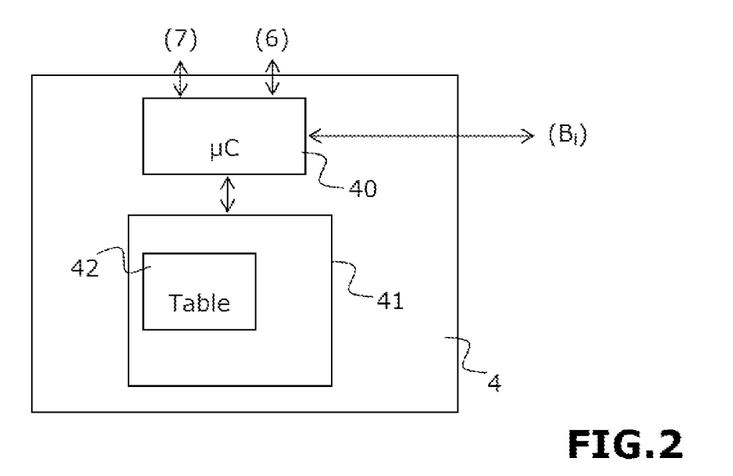
FIG. 2 schematically shows the central management system of FIG. 1.

The central management system 4, a simplified architecture of which is shown in FIG. 2, basically comprises an information processing unit 40, of the microcontroller or PC type, a memory 41, and at least one interface (not shown) for exchanging information with the terminals $B_i$, the electric meter 6 and, where necessary, the entry control device 7, via the wired link 5 (of the Ethernet or RS 485 type) or via a wireless link.

The central management system 4 particularly must know, preferably at all times, the status (free/occupied) of each terminal $B_1$, $B_2$, ... $B_i$, $B_N$ of the installation. To this end, it implements centralized storage, preferably in real time, in its memory 41, based on information exchanged with the terminals:

on the one hand, the electric charging terminals belonging to a first subset of the set of electric charging terminals $B_1$, $B_2$, ... $B_i$, $B_N$, this first subset comprising the terminals, called occupied terminals, to which a charging electric vehicle is connected; and on the other hand, the electric charging terminals belonging to a second subset of the set of electric charging terminals $B_1$, $B_2$, ... $B_i$, $B_N$, said second subset comprising the available terminals to which no electric vehicle is connected.

In particular, as soon as a terminal is connected to a vehicle for charging, this terminal transmits an information message to the system 4, via the link 5, representing the connection of the cable, and thus the occupied status of the terminal. Similarly, as soon as a vehicle disconnects from a terminal, this terminal transmits an information message to the system 4, via the link 5, representing the disconnection of the cable, and thus the newly available status of the terminal.

The information relating to the terminals is preferably consolidated in the form of a table 42 stored and updated in the memory 41 of the system 4. The table 42 preferably comprises the following information, for each terminal of the installation: terminal identifier, maximum current value or maximum power delivered by the terminal, value of the allocated charging current, for the occupied terminals, the status of the terminal (cable connected or not connected, charging, end of charging), measured current charging value, total power consumed by a vehicle since the beginning of charging. For the occupied terminals, an identifier of the vehicle connected to the terminal and/or an identifier associated with the driver of this vehicle is/are also advantageously stored. An example of the values included in this table, corresponding to the situation in FIG. 1, is provided in FIG. 3.

The central management system 4 also must know the maximum permissible value $I_{MAX}$ of the current at the connection point 3 for connecting the installation 1 to the electric power distribution network 2. This value $I_{MAX}$ particularly depends on the section of the conductors of the distribution network 2, the physical characteristics of the connections between the network 2 and the installation 1 and the contractual value of the power allocated by the power distributor. It can be stored in the memory 41 during a configuration operation. By way of a variation, if the measurement device 6 is a smart meter, the central management system 4 can periodically acquire this value by polling the meter 6.

Finally, the central management system 4 must know the sum of the charging currents delivered by the occupied electric charging terminals, i.e. the terminals of the first subset. This information is measured by the meter 6 and is transmitted in order to be stored in the central management system 4.

Preferably, the measurement is performed periodically in order to continuously know the current that is actually consumed by all the vehicles. By way of a variation, the measurement is only performed when the operating conditions of the terminals change, typically during a new connection of a vehicle to a terminal until then available, or when a vehicle is disconnected from a terminal until then occupied.

By having all the aforementioned information available, the central management system 4 will be able to compute an available current value $I_{disp}$ according to a difference between the maximum permissible value $I_{MAX}$ and the sum of the delivered charging currents.

This computation can be performed and refreshed in real time, or only when a new vehicle arrives at the entrance to the parking lot in order to charge its electric battery.

When a new electric vehicle arrives in the parking lot, preferably when it connects to a terminal, the central management system 4 computes the deviation that exists between the available current value $I_{disp}$ and a charging current value able to be delivered by at least one available terminal at the time of entry of this new vehicle, i.e. by a terminal of the second subset. By way of a variation, this deviation is continuously computed, or at the very least is periodically computed.

As previously stated, one of the main aims of the management according to the invention is to accept charging of any new incoming vehicle that requires charging, clearly provided that at least one terminal is available in the parking lot. This management is achieved by proceeding differently depending on whether the computed deviation is positive or negative.

More specifically, a positive deviation means that the connection of the considered terminal to the new incoming vehicle will not result in the maximum permissible value $I_{MAX}$ being exceeded. In this case, there is nothing preventing authorization, without implementing a particular step, of the charging of this incoming vehicle at this terminal.

However, if the deviation is negative, the system 4 will then, according to the invention, transmit an order to one or more occupied terminals, i.e. selected from the first set, to reduce the charging current values that each one delivers to the vehicle connected thereto, with the sum of the corresponding reductions being intended to cover said deviation in absolute value.

The terminals to which a reduction order is transmitted are preferably selected as a function of the amount of electric power that they have already delivered to the vehicles connected thereto, whilst favoring the highest amounts. Thus, the system 4 will use the information stored in the last column of the table 42 defined above to identify the vehicles, and thereby the terminals that are connected thereto, which have already stored the most power since their charging began.

The new incoming vehicle then can be authorized to charge without the risk of exceeding the maximum permissible value $I_{MAX}$.

Thus, in both cases (positive or negative deviation), the central management system 4 finishes by transmitting an authorization message, to the terminal considered in the computation of the deviation, for charging the new incoming vehicle at a predetermined charging current value.

Preferably, the predetermined charging current value corresponds to the maximum charging current value that the considered terminal is able to deliver.

Proceeding along these lines ensures that the vehicles are equally treated by offering an incoming vehicle the possibility of beginning charging at the maximum power of the terminal that will be assigned thereto, with a low impact on the vehicles that are already charging, since only the terminals connected to the vehicles with an already advanced charging cycle are preferably selected to receive a power reduction order.

Figure 3:
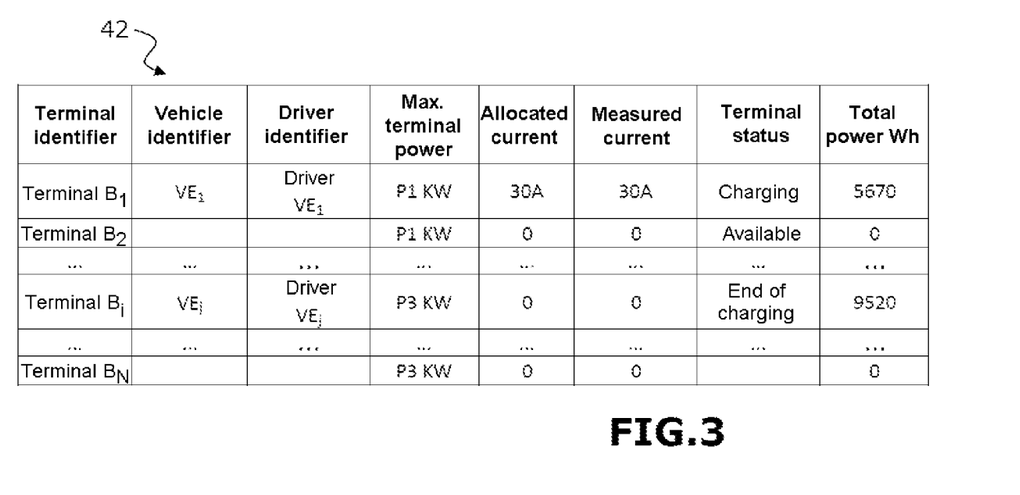
FIG. 3 provides an example of a table used by the central management system of FIG. 1.

Of course, the values of the table 42 are updated as a result.

Over time, some charging vehicles reach the maximum charging level and the charging stops. Consequently, the available charging current value increases. Thus, as soon as a vehicle connected to a charging terminal of the first set disconnects, the steps of storing, of measuring the sum of the charging currents and of computing, by the central management system 4, the available current value $I_{disp}$ are updated. A vehicle is disconnected either automatically by stopping the charger when the battery is fully charged or manually by removing the cable connecting the vehicle to the terminal.

In this way, the system 4 will be able, in a preferred embodiment, to transmit, to at least one of the terminals that previously received a reduction order, a new order to increase the current charging value that it delivers to the vehicle connected thereto by a value that is determined as a function of the updated available current value $I_{disp}$.

The information processing unit 40 comprises, in the form of a computer program, means for determining, by computation and/or analysis, the values representing currents, and for transmitting, to the relevant terminals, a message authorizing charging or an order to reduce or increase the charging current.

Figure 4:
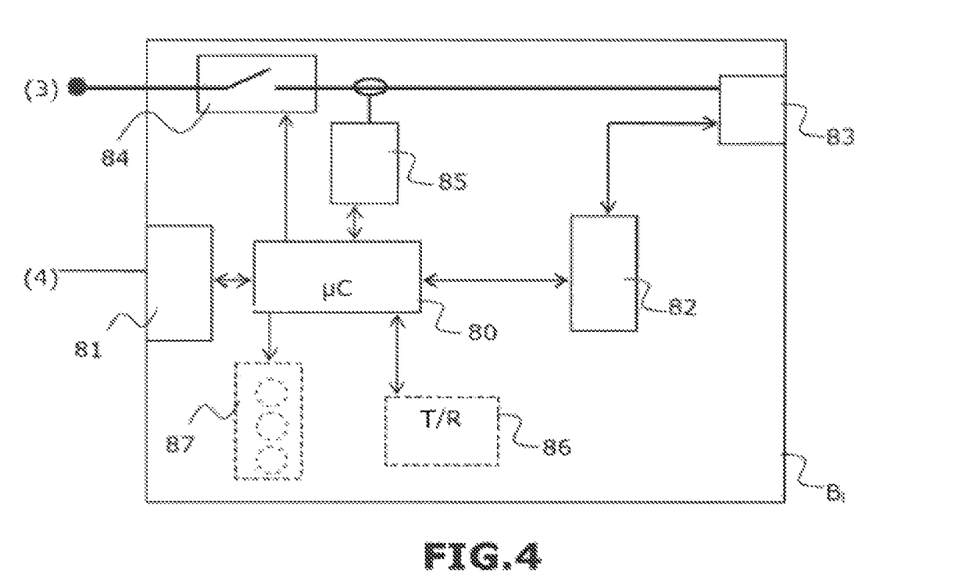
FIG. 4 schematically shows an example of a charging terminal included in the installation of FIG. 1.

FIG. 4 schematically shows a possible architecture for each terminal $B_j$ included in the electric vehicle battery charging installation 1 of FIG. 1. As in FIG. 1, the elements shown with dashed lines in this FIG. 4 are optional but correspond to a sophisticated version of the system.

As shown in FIG. 4, a charging terminal $B_j$ basically comprises a microcontroller 80, an interface 81 (of the Ethernet or other type) for communicating with the central management system 4, an interface 82 for communicating with any vehicle connected to the terminal (particularly allowing exchanges according to standard EN 61851-1), a specific electric socket 83 for receiving a charging cable of a vehicle, a switching relay 84 for the charging circuit, and a module 85 for measuring the current and the power delivered when the relay 84 is closed. The terminal $B_j$ further comprises means (not shown) for interpreting, in accordance with standard EN 61851-1, the orders to reduce or increase the charging current value that are received, where necessary, from the central management system 4, in order to transmit them to the vehicle.

When a vehicle is connected to a charging terminal $B_j$, there is an exchange of information, according to standard EN 61851-1, between the terminal and the vehicle. The terminal analyses the information transmitted by the vehicle and, if this information is relevant, the presence of the vehicle connected to the end of the cable is confirmed.

At the end of charging, the charger on board the vehicle interrupts the current and transmits "disconnection request" information to the terminal $B_j$, in accordance with standard EN 61851-1. The terminal $B_j$ analyses the "disconnection request" information and relays it to the central management system 4 for processing.

The terminal $B_j$ is also able to receive orders for reducing or increasing the charging current value that it delivers to the vehicle connected thereto. The terminal $B_j$ analyses any received modulation order and transmits, to the vehicle connected thereto, in accordance with standard EN 61851-1, information representing this value, for example, in the form of square wave electric signals with an amplitude of +12 V and −12 V at a width modulated frequency of 1,000 Hz. These electric signals are transmitted to the vehicle via the control circuit and their duty cycle represents the maximum value of the current that the charger on board the vehicle should consume. Standard EN 61851-1 states that the duty cycle expressed as a percentage is equal to the value of the current expressed in ampere divided by 0.6 (duty cycle as %=current [A]/0.6).

The terminal $B_j$ further optionally comprises a wireless transmitter-receiver device 86 and light devices 87, for example, different colored diodes, the purpose of which will be described hereafter.

Throughout the aforementioned description, only a basic version of the management system according to the invention has been described. The previously described system can function in the case of a parking lot with free access to the charging terminals and will implement the various steps described above, particularly the computation of the deviation, using the terminal to which a new vehicle is connected. In particular, the step of computing the deviation described above will be performed as soon as the new incoming electric vehicle connects to any of the available terminals, using the information relating to this terminal.

However, this basic version does not take into account another problem that can arise with respect to the management of a parking lot, in particular with a large number of electric charging terminals, with this problem relating to, on the one hand, the allocation of a specific terminal, from among the available terminals, to a new incoming vehicle and, on the other hand, to a verification that a vehicle that is allocated a terminal will effectively connect to the allocated terminal.

In order to overcome this problem, in a more sophisticated version of the management system, when a new vehicle arrives at the entrance to the parking lot P, a preliminary terminal allocation step is also implemented to determine the available terminal to which the new incoming vehicle should connect. The computation of the deviation, which is used to determine whether or not a reduction order needs to be sent, is then performed on the basis of information relating to the terminal that is thus allocated. Preferably, the computation of the deviation is performed once the vehicle is effectively connected, so as to prevent reduction orders from being sent in the event that the vehicle does not ultimately connect to the terminal that has been allocated thereto.

Once the vehicle connects to the allocated terminal, provision is also made to verify that it is effectively connected to the terminal that has been allocated thereto.

The allocation of a terminal preferably is contextual so as to best adapt to the new vehicle that arrives for charging purposes. Indeed, the electric or hybrid vehicles that are likely to arrive vary and they have very different technical characteristics, both in terms of the type of electric battery that is used and of the size of the vehicles. It can involve electric quadricycles that are low powered, have a low battery capacity and have a low-powered on board battery, or powerful sedans with a large battery capacity and a high-powered on board charger. Therefore, a charging terminal and a location needs to be allocated that are adapted to the technical characteristics of the incoming vehicles, with. The main characteristic being the power of the charger on board the vehicle.

The implementation of these additional steps of allocating terminals and of verifying the correct pairing between a new vehicle and the allocated terminal can be performed by means of two information exchange devices that are appropriately placed inside the system. Provision particularly can be made for a first device for exchanging identification information of the new vehicle and/or of its driver to be installed in the immediate vicinity of the device 7 for controlling the entrance to the parking lot (typically gates or barriers), or even integrated therein. The second device for exchanging identification information of the new vehicle and/or of its driver is, for its part, installed in the immediate vicinity of the charging terminals, or even preferably integrated therein, as shown in FIG. 4 by the wireless transmitter-receiver device 86.

The first device (reference sign 7 hereafter for the sake of simplification) and the second device for exchanging identification information (reference sign 86 hereafter also for the sake of simplification) preferably are directive, low range wireless transmitter-receiver devices linked to the central management system 4 by an information communication link. The first and second devices for exchanging identification information exchange information with at least one wireless communication and identification module, that is either in the possession of the driver, for example, in the form of a chip card 10 (see FIG. 5), or is integrated in the vehicle (see FIG. 6).

At the entrance to the parking lot, the first device 7 for exchanging identification information transmits, preferably continuously, a first invitation message to be to be conveyed that comprises, for example, the following information: the name of the parking lot, an invitation to charge the battery and optionally the number of available charging points. Upon receipt and recognition of this first message, the wireless communication and identification module 10 responds with the transmission of an identification message of the new vehicle and/or of its driver.

The identification message can comprise one or more parameters, from which at least the maximum power of the charger on board the incoming vehicle can be determined. Other information representing characteristics of the vehicle advantageously can be used and added to the message, such as: the type of vehicle (motorbike, sedan, utility), its weight, its dimensions, identification information, such as the registration number and/or the serial number. The driver identification information particularly represents their rights and conditions for using the parking lot and the charging terminals.

The identification data transmitted in this response message are subsequently transmitted to the central management system 4, which will be able to analyze them in order to allocate an available charging terminal that will be the best possible match for the characteristics of the incoming vehicle.

The contextual allocation of the terminals is performed by the central management system 4 by means of an allocation table, much like the previously described table, which stores information associated with each terminal, its environment and, temporarily, with the vehicle and/or its driver: the terminal identifier, the status of the terminal (free, reserved, charging, inaccessible), characteristics of the terminal, charging vehicle identifier, power of the charger of the charging vehicle, value of the charging current, driver identifier, etc. The central management system 4 allocates a charging terminal to the incoming vehicle according to the characteristics of the charger, such that a low-powered terminal preferably will be allocated to a vehicle with a low-powered on board charger and such that a high-powered terminal will be allocated to a vehicle with a high-powered on board charger. Furthermore, knowing the dimensional characteristics of the incoming vehicle allows the central management system 4 to allocate a specific location if the parking lot provides locations adapted for various vehicles, such as motorbikes, tricycles, small or large sedans. Other parameters can be involved in the allocation of a terminal, for example, (i) the current circulating in the phase wires of the electric installation, (ii) the total power delivered by the various electric power supply circuits of the terminals, (iii) the ambient temperature prevailing in the various areas of the parking lot.

The identification of the driver allows a specific terminal and/or location to be allocated to an incoming vehicle. For example, this is the case for disabled drivers who need to charge their vehicles in suitable locations or for doctors having reserved terminals.

Figure 7:
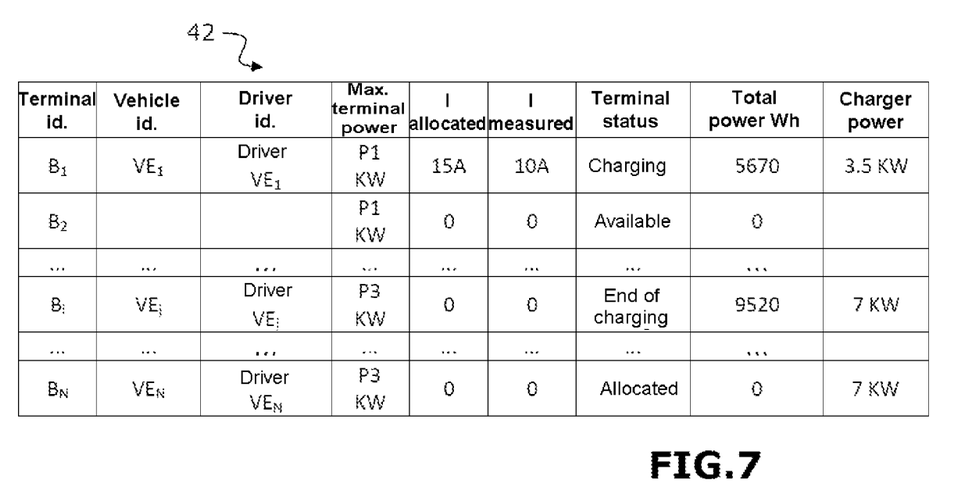
FIG. 7 shows an example of an allocation table used by the central management system of FIG. 1.

An example of the values included in this allocation table, corresponding to the situation of FIG. 1, is provided in FIG. 7, based on the assumption of a new vehicle $V_N$ arriving at the entrance to the parking lot.

Once the terminal is allocated (terminal $B_N$ in the allocation table of FIG. 7), the central management system 4 transmits, to the first device 7 for exchanging identification information, a terminal allocation message comprising information representing the location of the allocated charging terminal. This information is relayed by the first device 7 for exchanging identification information to the wireless communication and identification module 10.

Once notified of the location of the charging terminal that is allocated thereto, the driver of the vehicle can proceed thereto. A step of verifying the pairing between the new incoming vehicle and the allocated charging terminal is required in order to authorize charging if the result of the verification is positive and to prevent charging if the result is negative. A new exchange, this time between the wireless communication and identification module 10 and the second device 86 for exchanging identification information takes place. The identification data received by the second device 86 for exchanging identification information are relayed to the central management system 4, which can then verify, using the allocation table, whether or not it is the vehicle to which the terminal has been allocated. The light devices 87, for example, a green light, invite the driver to connect the charging cable to the terminal. Charging will not be authorized if the information does not match. The light devices 87, for example, a red light, notify the driver that charging is prohibited. By way of a variation, provision can be made so that the identification message sent by the module 10 to the second device 86 contains the identification of the allocated terminal. Similarly, no charging will be authorized if there is no match between the allocated terminal and the terminal that the vehicle approaches.

Different technology can be used for the communications between the first device 7 and the second device 86 for exchanging identification information and the wireless communication and identification module 10, such as, for example, RFID technology (Radio Frequency Identifier), DSRC technology (Dedicated Short Range Communications) or an optical device using LIFI (Light Fidelity) technology.

In the case of RFID technology, the wireless RFID communication devices comprise a poller and tags. The RFID tags transmit, in response to the poller, unique information such as a number or a series of predefined data. This information is, in this case, the identification information of the incoming vehicles and/or of their driver. When an RFID tag is used, the information representing the location of the charging terminal is transmitted to the driver in visual form by means of a display associated with the poller of the first device or on the display of a smartphone, for which the RFID function has been used to transmit the identification information to the first device.

A DSRC system allows, for its part, data communication between two vehicles or vehicles and an infrastructure via a directive radio link. The DSRC communication system is used in Europe for electronic motorway tolls and in parking lots and the directive radio transmitter-receiver installed in a vehicle is oriented toward the front and/or the rear of the vehicle. Thus, when a new vehicle arrives in the vicinity of a parking lot entrance gate or a charging terminal, the first and the second device for exchanging identification information respectively transmit the identification information of said vehicle and/or of its driver to the central management system 4.

Finally, optical LIFI technology using visible light enables wireless communications between two close devices. It has several advantages, for example, no interference with radio equipment and little or no interference with other physically close LIFI equipment. Information transmission uses a roughly conical optical channel and the well managed dimensional characteristics of the optical channel negate the risks of interference with a neighboring optical channel. Like the devices using DSRC technology, devices using LIFI technology are used to implement the transmission of the identification information to the central management system 4.

When one of the two DSRC or LIFI technologies is used to exchange identification information between the module 10 and the second device 86, the verification of the pairing between the vehicle and the terminal is performed when the vehicle approaches the terminal and a green or red light device notifies the driver of the authorization or prohibition of charging. Thus, if charging is authorized, the driver parks their vehicle in the location for the terminal, otherwise the driver must drive their vehicle near the terminal that is allocated thereto.

Figure 5:
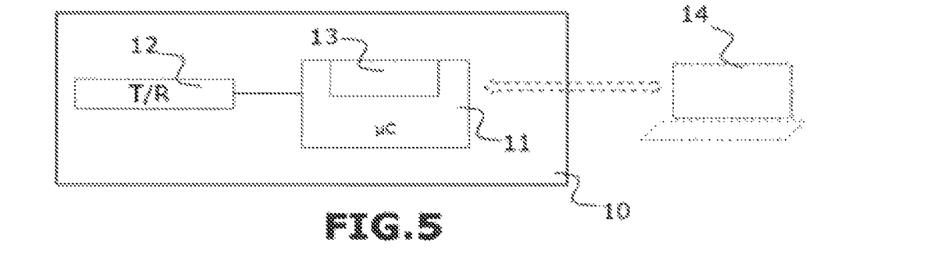
FIG. 5 schematically shows an example of a wireless communication and identification module in the form of a portable medium, for example, in credit card format.

FIG. 5 schematically shows the architecture of a wireless communication and identification module 10. In this case, this module is in the form of a portable medium, for example, in the format of a credit card, and basically comprises an information processing unit 11, for example, a microcontroller, a transmitter-receiver 12 and a storage memory 13. The storage memory 13 particularly will allow vehicle and/or driver related information to be stored. This information can be configured at any time and conventionally is configured by means of configuration equipment 14. The storage memory will also be able to be used to store, at least temporarily, information relating to the terminal that has been allocated thereto. This information then can be included in the identification message exchanged between the module 10 and the second device 86.

Figure 6:
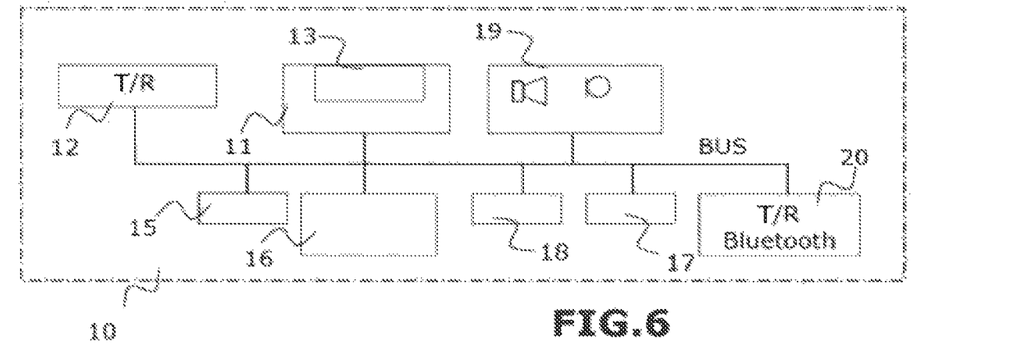
FIG. 6 schematically shows another example of a wireless communication and identification module, on board a vehicle.

FIG. 6 schematically shows another possible architecture of a wireless communication and identification module 10, in the form of a wireless communication system on board a motor vehicle.

The various elements forming the system are linked together by means of at least one data transmission bus. Several types of bus are currently used in motor vehicles, such as the CAN (Controller Area Network), the LIN (Local Interconnect Network) or the Flexray bus. Throughout the description, the term CAN bus will be used to represent the data transmission bus of the electric vehicle for the sake of simplification.

The module 10 contains an information processing unit 11, which can be an on-board computer of the vehicle, comprising one or more microcontrollers, a transmitter-receiver 12 and a storage memory 13. Again, in this case, the storage memory 13 will particularly be able to store the vehicle and/or driver related information. The storage memory will also be able to be used to store, at least temporarily, information relating to the terminal that has been allocated thereto. This information then can be included in the identification message exchanged between the module 10 and the second device 86. The on-board computer communicates, via the bus, with the charger 15 for the vehicle battery 16 in order to acquire and store, in a memory, the information representing the maximum power of the charger. The module can further comprise various means for interfacing with the driver, which are mainly devices or subsystems existing in the motor vehicles. For example, in addition to the on-board computer 11, a display 17, a keyboard 18, an audio device 19 comprising at least one speaker and a microphone, a Bluetooth radio interface 20, etc., can be cited.

The means for acquiring, storing and transmitting the identification parameters of the vehicle and/or of its driver are partially or completely implemented by a computer program loaded into the on-board computer 11 in association with the other devices of the vehicle.

The on-board computer 11 of the vehicle comprises means for acquiring, via the keyboard 18 and/or suitable accessories, for example, an RFID poller or the Bluetooth interface 20, the identification information of the driver. An RFID badge, or a smartphone communicating by Bluetooth, comprising information representing the identity of the driver thus can transmit the information to the on-board computer following an acquisition request from said computer.

The use of the keyboard 18 and of the display 17 can, for example, allow the driver, during a manual configuration sequence, to conventionally enter their identification information. To this end, a specific graphic interface is generated by the on-board computer 11 and is transmitted to the display 17. By way of a variation, independently of or in combination with the keyboard 18 and the display 17, the audio device 19 comprising a speaker and a microphone respectively associated with a voice synthesis and voice recognition system can be used to configure the identification information.

The identification information of the vehicle also can contain, in addition to the maximum power of the charger, additional characteristics, such as the make of the vehicle, its type or model, the registration number or the chassis number. With this information having been previously stored in the memory 13 of the on-board computer 11 through a configuration process.

The wireless transmitter-receiver 12 allowing messages to be exchanged with the entrance to the parking lot or with the terminals is disposed at the front and/or at the rear of the vehicle depending on its construction method.

In the aforementioned description, it has been assumed that the charging terminal installation 1 was connected to a conventional electric power distribution network 2. However, the increasing share of renewable energies (solar, wind, tidal) in the production of electric power requires adaptive management of the power consumption as a function of the production conditions. In the near future, this adaptive management will be implemented by a smart electric power distribution network (called Smart Grid in specialist literature), in which computers communicate, on the one hand, with the various power production means and, on the other hand, with the power meters in order to modify, depending on the amount of produced power, the consumption and pricing conditions. With the consumption conditions being defined (i) as the maximum permissible value of the current at the connection point for connecting the installation to the electric power distribution network or (ii) particular commands for authorizing or preventing the operation of certain categories of electric hardware.

Possible improvements to the management system also can be considered, such as those previously described within the context of the use of a smart distribution network. In this case, the central management system 4 preferably is designed to continuously conventionally communicate with the smart meter 6 located at the connection point 3 for connecting the electric installation of the parking lot to said distribution network 2, in order to gather information representing the maximum permissible value of the current at the connection point for connecting the electric installation to the electric power distribution network. Thus, in the event of an increase in said maximum permissible current value, the central management system 4 determines and modifies an increase in the charging current value of the vehicles and does the opposite in the event of a reduction in said maximum current value.

The electric installation of the parking lot supplies power to the charging terminals and to numerous other items of electric equipment, such as the lifts, the electronic computer equipment, amongst others, the central management system 4, the parking lot lighting, etc. Depending on the circumstances, the electric power distribution network 2 can transmit information representing specific commands to the smart meter 6, which commands may or may not be associated with modifications to the maximum permissible current value.

The central management system 4 also advantageously can continuously communicate with the smart meter 6 of the installation in order to acquire the information representing specific commands. For example, a first specific command deactivates the charging of the vehicles while maintaining the charging of priority vehicles (for example, vehicles for doctors, disabled drivers); a second specific command deactivates the charging of all the vehicles. Thus, when the first specific command appears, the central management system 4 determines, using the previously described allocation table, the priority vehicles for which charging is maintained (for example, vehicles for doctors or disabled drivers).

Figure 8:
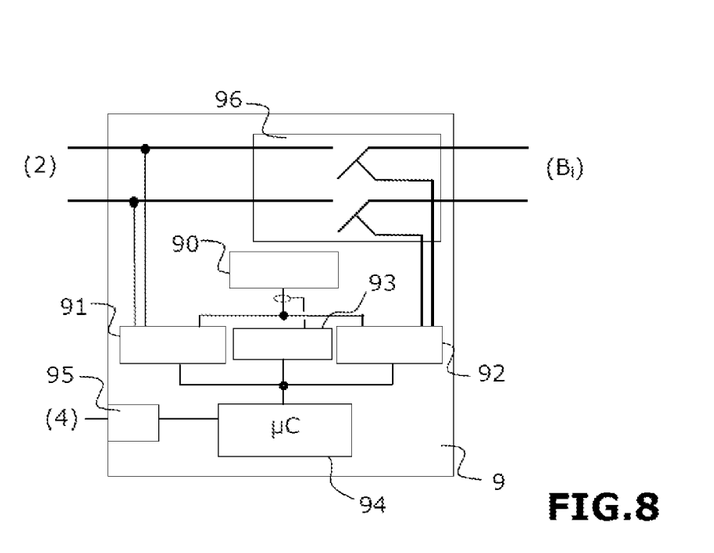
FIG. 8 schematically shows a device for storing and recovering electric power that is likely to form part of the management system of FIG. 1.

According to another possible configuration, in particular to overcome the shortfall in the maximum permissible power $I_{MAX}$ of the current at the connection point 3, for example, when the number of vehicles to be simultaneously charged is high, the management system of 1 can further comprise a device 9 for storing and recovering electric power (FIG. 1). FIG. 8 schematically shows such a device 9 for storing and recovering electric power, which basically comprises at least one battery 90, one battery charger 91, one inverter 92 for generating an alternating electric current from the electric power stored in the battery 90, one electric power meter 93, information processing means 94, for example, a microcontroller, means 95 for communicating with the central management system 4, and at least one switching device 96 for linking the storage device 9 to the electric installation of the parking lot. In this configuration, the central management system 4 is able to determine the period for storing power, which period begins when the value of the current available for charging is sufficient for charging the battery of said storage device and/or when the power is available at a favorable rate. The central management system 4 is also able to determine the end of the storage period when (i) the conditions for beginning storage cease to exist and/or the amount of stored power has reached a maximum predetermined value.

The central management system 4 also determines the charging current value of the battery of said storage device 9 according to the rules that are used for charging vehicles and transmits information to said device 9 that represents said electric storage current value. With this information being conventionally transmitted to said information processing means 94, which control the battery charger 91 of said storage device 9. Consequently, with the storage device 9 being considered to be a vehicle, the battery charger 91 controls the charging current according to the value that is sent thereto by the central management system 4 and begins charging. The electric power meter 93 included in the storage device 9 measures the amount of power stored during the storage period.

The central management system 4 also determines the power recovery period that begins when the amount of power stored in the battery 90 has reached a predetermined value and/or when the maximum permissible current value supplied by the power distribution network 2 is insufficient for charging the vehicles and/or when the distribution network 2 is faulty. The central management system 4 determines the end of the recovery period when (i) the conditions for beginning recovery cease to exist and/or the amount of stored power has reached a minimum predetermined value.

The central management system 4 determines the maximum permissible value of the recovery current that at least depends (i) on the technical characteristics of the inverter 92 and of the battery 90, (i) on the amount of stored power and (iii) on the additional power requirements of the charging installation 1 for charging the vehicles; with this information being conventionally transmitted by the central management system 4 to said information processing means 94 that control the inverter 92. Consequently, the inverter 92 controls the recovery current according to the value sent thereto by the central management system 4 and begins recovery. The electric power meter 93 included in the storage device 9 measures the amount of power stored during the recovery period.

The information processing unit 94 of the electric power storage and recovery device 9 comprises, in the form of a computer program, the means required to implement the various functions of said storage and recovery device. The storage period begins with the reception, by said storage and recovery device, from the central management system 4, of information representing the value of the electric storage current. Consequently, the microcontroller 94 analyses this information, then conventionally adjusts and activates the battery charger 91 according to the electric storage current value. When the charger 91 is activated, the inverter 92 is deactivated. During charging, the electric power meter 93 records the power stored in the battery 90. The end of the storage period is determined by the central management system 4, which transmits an end of charging command message to said storage and recovery device 9.

The recovery period begins with the reception, from the central management system 4, of information representing the electric recovery current value. Consequently, the microcontroller 94 analyses this information, then activates the switching device 96 (i) to avoid unnecessarily supplying power to the electric power distribution network during the recovery period and (ii) to supply the charging terminals via the inverter 92. The information representing the electric recovery current value allows the microcontroller 94 to conventionally adjust and activate the inverter 92 according to the electric current recovery value. When the inverter 92 is activated, the charger 91 is deactivated. During recovery, the electric power meter 93 records the recovered power. The end of the recovery period is determined by the central management system 4, which transmits an end of recovery command message to said storage and recovery device 9.

The microcontroller 94 continuously acquires the data from the electric meter 93 and transmits the information representing the stored or recovered power to the central management system 4. Consequently, the central management system 4 determines the storage and recovery periods.

Figure 9:
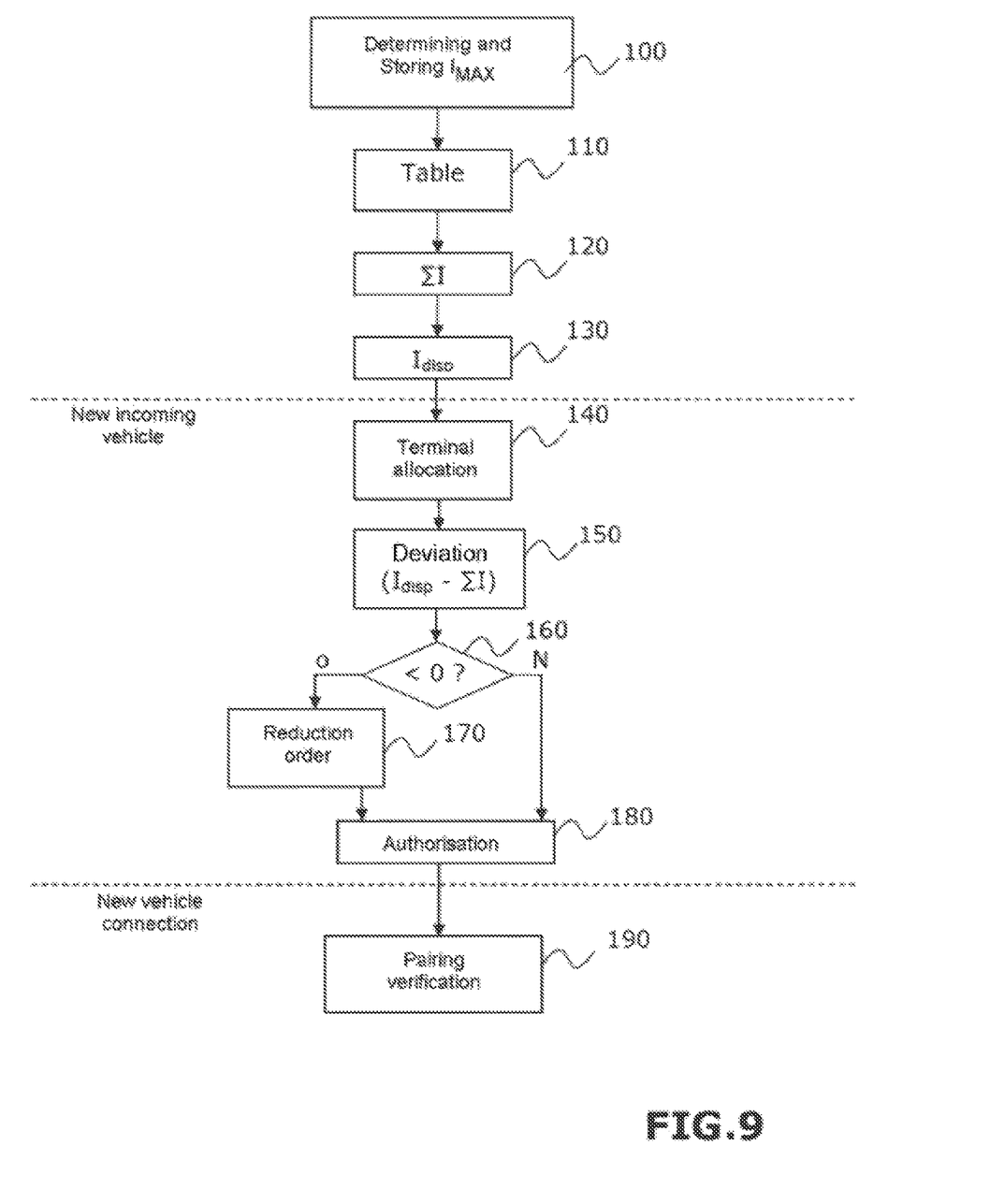
FIG. 9 shows a series of steps that are likely to be implemented in a management method according to the invention.

FIG. 9 summarizes steps likely to be implemented in a management method according to one possible embodiment of the invention, when a new vehicle is introduced:

Step 100 corresponds to the determination of the maximum permissible value $I_{MAX}$ of the current at the connection point 3 for connecting the installation 1 to the electric power distribution network 2 and to storing said maximum permissible value $I_{MAX}$ in the central management system 4.

Step 110 represents the centralized storage in said central management system 4 of the status of the terminals, particularly their available or occupied status (first and second subsets).

Step 120 corresponds to the measurement of the sum of the charging currents delivered by the electric charging terminals of the first subset.

Step 130 corresponds to the computation, by the central management system 4, of the available current value $I_{disp}$ according to a difference between said maximum permissible value $I_{MAX}$ and the sum of the delivered charging currents.

The following steps are implemented for each new electric vehicle entering the parking lot P for charging purposes:

Step 140 corresponds to the allocation of a terminal by the central management system 4, with this allocation preferably being contextual.

Step 150 corresponds to the computation, by the central management system 4, of the deviation between the computed available current value $I_{disp}$ and a charging current value able to be delivered by the allocated terminal.

Step 160 represents the control that is undertaken on the deviation thus computed.

If said deviation is negative, the system 4 transmits (step 170), to one or more terminal(s) selected from the first set, an order to reduce the charging current value that each terminal delivers to the vehicle connected thereto, with the sum of the corresponding reductions being intended to cover said deviation in absolute value.

Step 180 represents the transmission to the allocated terminal of an authorization message for charging said new incoming vehicle at a predetermined charging current value.

Finally, step 190 shows the control that is undertaken to verify the pairing between the new incoming vehicle and the allocated charging terminal in order to authorize charging if the result of the verification is positive and to prevent it if the result is negative.

As previously stated, the preceding steps are not necessarily performed in the order indicated in FIG. 9. In particular, the computation of the deviation and, where necessary, the transmission of the reduction orders, can be performed only after a positive verification of the pairing.

The invention claimed is:

1. A method for managing charging currents delivered by an installation for charging electric vehicle batteries in a parking lot, said installation comprising:
   a set of electric charging terminals connected to an electric power distribution network, each electric charging terminal being able to deliver a charging current value to an electric vehicle connected thereto, comprising the following steps:
   determining a maximum permissible value $I_{MAX}$ of the current at a connection point for connecting the installation to the electric power distribution network and storing said maximum permissible value $I_{MAX}$ in a central management system linked to said terminals of the set;
   centralized storing, in said central management system, on the one hand, of the electric charging terminals belonging to a first subset of said set of electric charging terminals, said first subset comprising the terminals, called occupied terminals, to which a charging electric vehicle is connected and, on the other hand, of the electric charging terminals belonging to a second subset of said set of electric charging terminals, said second subset comprising the available terminals to which no electric vehicle is connected;
   measuring the sum of the charging currents delivered by the electric charging terminals of said first subset;
   computing, by the central management system, an available current value $I_{disp}$ according to a difference between said maximum permissible value $I_{MAX}$ and the sum of the delivered charging currents; and
   for each new electric vehicle entering said parking lot for charging purposes:
   computing, by the central management system, a deviation between the computed available current value $I_{disp}$ and a charging current value able to be delivered by a determined terminal of the second subset;
   if said deviation is negative, transmitting, to one or more terminal(s) selected from the first set, an order to reduce the charging current value delivered by each terminal to the vehicle connected thereto, the sum of the corresponding reductions being intended to cover said deviation in absolute value; and
   transmitting, to said determined terminal of the second subset, an authorization message for charging said new incoming vehicle at a predetermined charging current value.

2. The management method as claimed in claim 1, wherein the predetermined charging current value corresponds to a maximum value of the charging current able to be delivered by said determined terminal of the second subset.

3. The management method as claimed in claim 1, wherein the terminals to which a reduction order is transmitted are selected according to the amount of electric power that they have already delivered to the vehicles connected thereto, whilst favoring the highest amounts.

4. The management method as claimed in claim 1, wherein said management method further comprises, as soon as a vehicle connected to a charging terminal of the first set disconnects, updating the steps of storing, of measuring the sum of the charging currents and of computing, by the central management system, the available current value $I_{disp}$, and transmitting, to at least one of the terminals that previously received a reduction order, a new order to increase the charging current value that it delivers to the vehicle connected thereto by a value that is determined as a function of the updated available current value $I_{disp}$.

5. The management method as claimed in claim 1, wherein the step of computing the deviation is performed as soon as the new incoming electric vehicle connects to said determined terminal.

6. The management method as claimed in claim 1, wherein said management method comprises an allocation step for determining the available terminal to which the new incoming vehicle should connect.

7. The management method as claimed in claim 6, wherein the allocation of a terminal is performed by the central management system, based on at least one identification parameter of the new vehicle and/or of its driver.

8. The management method as claimed in claim 7, wherein said at least one identification parameter allows at least the maximum power of a battery charger on board said new vehicle to be determined.

9. The management method as claimed in claim 6, wherein said management method further comprises a step of verifying the pairing between the new entering vehicle and the allocated charging terminal in order to authorize charging if the result of the verification is positive and to prevent it if the result is negative.

10. The management method as claimed in claim 1, wherein the step of determining a maximum value $I_{MAX}$ comprises periodic polling, by the central management system, of a smart meter.

11. A system for managing charging currents delivered by an installation for charging electric vehicle batteries in a parking lot, said installation comprising:
   a set of electric charging terminals connected to an electric power distribution network, each electric charging terminal being able to deliver a charging current value to an electric vehicle connected thereto, said management system comprising:
   means for determining a maximum permissible value $I_{MAX}$ of the current at a connection point for connecting the installation to the electric power distribution network;
   a central management system connected to said terminals of the set and able to store said maximum permissible value $I_{MAX}$, said central management system also being able to store, on the one hand, the electric charging terminals belonging to a first subset of said set of electric charging terminals, said first subset comprising the terminals, called occupied terminals, to which a charging electric vehicle is connected and, on the other hand, the electric charging terminals belonging to a second subset of said set of electric charging terminals, said second subset comprising the available terminals to which no electric vehicle is connected;
   means for measuring the sum of the charging currents delivered by the electric charging terminals of said first subset;
   said central management system also being able to compute an available current value $I_{disp}$ according to a difference between said maximum permissible value $I_{MAX}$ and the sum of the delivered charging currents, and, for each new electric vehicle entering said parking lot for charging purposes, being able:
   to compute a deviation between the computed available current value $I_{disp}$ and a charging current value able to be delivered by a determined terminal of the second subset;
   if said deviation is negative, to transmit, to one or more terminal(s) selected from the first set, an order to reduce the charging current value delivered by each terminal to the vehicle connected thereto, the sum of the corresponding reductions being intended to cover said deviation in absolute value; and to transmit, to said determined terminal of the second subset, an authorization message for charging said new incoming vehicle at a predetermined charging current value.

12. The management system as claimed in claim 11, wherein said management system further comprises a first device for exchanging identification information of the new incoming vehicle and/or of its driver, placed in the vicinity of or integrated in a device for controlling access to the parking lot, said first device being able to exchange identification information with a wireless communication and identification module allowing a vehicle and/or its driver to be identified and to transmit this identification information to said central management system.

13. The management system as claimed in claim 12, wherein said first device is also able to receive a terminal allocation message transmitted by said central management system, the allocation message comprising information representing an allocated terminal, and to relay this message to said wireless communication and identification module.

14. The management system as claimed in claim 13, wherein said management system further comprises a second device for exchanging identification information of the new incoming vehicle and/or of its driver, placed in the vicinity of or integrated in said allocated terminal, said second device being able to exchange identification information with said wireless communication and identification module allowing a vehicle and/or its driver to be identified.

15. The management system as claimed in claim 11, wherein said management system further comprises a device for storing and recovering power, and in that the central management system is able to determine and to control the periods for storing and recovering electric power and a charging current value of a battery of the device for storing and recovering power.

16. The central management system for implementing the management method as claimed in claim 1, said central management system being able to exchange messages with each of the terminals of the charging installation, and being able:
to store said maximum permissible value $I_{MAX}$;
to store, on the one hand, the electric charging terminals belonging to said first subset of said set of electric charging terminals and, on the other hand, the electric charging terminals belonging to said second subset of said set of electric charging terminals;
to compute said available current value $I_{disp}$ according to a difference between said maximum permissible value $I_{MAX}$ and the sum of the delivered charging currents, and, for each new electric vehicle entering said parking lot for charging purposes:
to compute a deviation between the computed available current value $I_{disp}$ and a charging current value able to be delivered by a determined terminal of the second subset;

if said deviation is negative, to transmit, to one or more terminal(s) selected from the first set, an order to reduce the charging current value delivered by each terminal to the vehicle connected thereto, the sum of the corresponding reductions being intended to cover said deviation in absolute value; and to transmit, to said one determined terminal of the second subset, an authorization message for charging said new incoming vehicle at a predetermined charging current value.

17. The central management system as claimed in claim 16, wherein, as soon as a vehicle connected to a charging terminal of the first set disconnects, said central management system updates the storage of the measurement of the sum of the charging currents and the computation of the available current value $I_{disp}$, and transmits, to at least one of the terminals that previously received a reduction order, a new order to increase the charging current value that it delivers to the vehicle connected thereto by a value that is determined according to the updated available current value $I_{disp}$.

18. The central management system as claimed in claim 16, wherein said central management system is also able to deactivate all or part of the charging of motor vehicles, in particular on receipt of commands received from the electric power distribution network.

19. An electric charging terminal for implementing the management method as claimed in claim 1, able to deliver a current charging value to an electric vehicle connected thereto according to a reduction order or an authorization message delivered by said central management system.

20. The electric charging terminal as claimed in claim 19, wherein said electric charging terminal is also able to deliver a current charging value to an electric vehicle connected thereto according to an order, transmitted by said central management system, to increase the charging current value that it delivers to the vehicle connected thereto.

21. The electric charging terminal as claimed in claim 19, wherein said electric charging terminal further comprises a wireless transmitter-receiver device for exchanging identification information with a wireless communication and identification module allowing a vehicle and/or its driver to be identified.

22. A wireless communication and identification module comprising wireless transmission-reception means able to exchange identification information of a vehicle and/or of its driver with said first and said second devices for exchanging identification information of the management system as claimed in claim 14.

23. The wireless communication and identification module as claimed in claim 22, wherein said wireless communication and identification module is on board said vehicle.

24. The wireless communication and identification module as claimed in claim 22, wherein said wireless communication and identification module is integrated in a portable medium.

* * * * *